United States Patent
Iihara et al.

[11] Patent Number: 5,692,590
[45] Date of Patent: Dec. 2, 1997

[54] SLIDABLE FREEWHEEL CLUTCH BETWEEN AXLE SHAFT AND WHEEL

[75] Inventors: Michio Iihara, Hamamatsu; Eiji Tajima, Shizuoka-ken; Yoshiaki Kuchiki, Iwata, all of Japan

[73] Assignee: NTN Corporation, Osaka, Japan

[21] Appl. No.: 578,915

[22] Filed: Dec. 27, 1995

[30] Foreign Application Priority Data

Dec. 28, 1994 [JP] Japan .................... 6-327646
Dec. 12, 1995 [JP] Japan .................... 7-323171

[51] Int. Cl.⁶ .................... B60K 17/26; F16D 41/00
[52] U.S. Cl. .................... 192/69.43; 192/69.91; 192/85 A; 180/247; 464/906
[58] Field of Search .................... 192/69.9, 69.91, 192/69.8, 66.1, 85 A, 69.43; 180/247; 464/162, 169, 906

[56] References Cited

U.S. PATENT DOCUMENTS

| | | | |
|---|---|---|---|
| 4,382,495 | 5/1983 | Fleitas | 180/247 X |
| 4,382,949 | 5/1983 | Kopich et al. | 180/247 X |
| 4,627,512 | 12/1986 | Clohessy | 180/247 |
| 4,632,207 | 12/1986 | Moore | 180/247 |
| 4,817,752 | 4/1989 | Lobo et al. | 180/247 |
| 5,024,307 | 6/1991 | Wakabayashi | 180/247 X |
| 5,219,054 | 6/1993 | Teraoka | 192/69.9 X |

FOREIGN PATENT DOCUMENTS 1-109432 7/1989 Japan .
1-289724 11/1989 Japan .

*Primary Examiner*—Andrea L. Pitts
*Assistant Examiner*—Troy Grabow
*Attorney, Agent, or Firm*—Nikaido, Marmelstein, Murray & Oram LLP

[57] ABSTRACT

The outer member (23) of a constant velocity joint is supported inside of a tubular housing (5) and is rotatable and slidable in the axial direction through the slide sleeve (8) and ball bearing (9) inside of the tubular housing. Between the axle hub (2) and the outer member (23), mutually engageable engaging portions (26) are provided which enable the sliding engaging and disengaging. A selector device makes the outer member displace against force of a spring to change over the engaging and disengaging.

5 Claims, 3 Drawing Sheets

SLIDABLE FREEWHEEL CLUTCH BETWEEN AXLE SHAFT AND WHEEL

BACKGROUND OF THE INVENTION

The present invention relates to a freewheel clutch for transmitting and cutting off power between the axle shaft and idler wheel.

The freewheel clutch is provided for the purpose of avoiding unnecessary rotation of the rotary parts from the transfer gear to the axle, in order to reduce the vibrating noise due to the drive system and improve the fuel economy, during two-wheel drive traveling in a four-wheel drive vehicle.

Generally, in the freewheel clutch, the power of the axle shaft is put into the axle bearing through a constant velocity joint. The axle bearing is fitted to the outer circumference of the knuckle part, and the idler wheel is coupled to an outer ring of the axle bearing. At the idler wheel end side of the outer ring, a cup-shaped housing is fixed, and a slide gear is fitted to the inner circumference of the housing so as to be slid able in the axial direction. The end of the shaft of the constant velocity joint penetrates through the inner circumference of the knuckle part, and is inserted into the inner space of the housing. A drive gear is fixed to this end at the shaft. By sliding the slide gear of the housing hydraulically, pneumatically or manually (using wire or the like), the slide gear is engaged or disengaged with the drive gear of the constant velocity joint, thereby transmitting and cutting off the power between the axle shaft and idler wheel (see Japanese Patent Publication Kokai No. 1-289724, Japanese Utility Model Publication Kokai No. 1-109432).

Thus, the conventional freewheel clutch is designed to control by engaging and disengaging between the slide gear and drive gear in the housing space provided at the idler wheel side, and hence involves the following problems.

(1) The structure of the knuckle part is increased in size and complicated in order to lead the working means of hydraulic, pneumatic or wire device from the car body side to the slide gear through the knuckle part.

(2) The shaft part of the constant velocity joint is very long.

(3) The route of the working means is usually provided in the knuckle, and is hence the wall thickness of the knuckle becomes thin, and the strength of the knuckle is doubted.

SUMMARY OF THE INVENTION

An object of the invention is to realize a simple and compact structure of freewheel clutch and eliminate the anxiety of the strength.

To achieve the object, the invention provides a freewheel clutch comprising an axle hub coupled to an idler wheel, an axle bearing having a hub outer ring coupled to a car body side member, a constant velocity joint having an inner member coupled to an axle shaft and an outer member supported by the car body side member rotatably and slidably in the axial direction, and an engaging portion making the axle hub of the axle bearing and the outer member of the constant velocity joint engage and disengage to each other due to the sliding displacement of the constant velocity joint, wherein the power is transmitted or cut off between the axle shaft and the idler wheel through the engaging and disengaging action of the entering portion, due to the sliding displacement of the constant velocity joint.

According to the invention, the following effects are brought about.

(1) Since the power transmission or cut-off is changed over by the sliding displacement of the constant velocity joint, the working means for changeover can be disposed outside of the knuckle part. Hence, the structure of the knuckle part is simplified and compact.

(2) The shaft part of the constant velocity joint is made notably shorter as compared with that of the prior art.

(3) The strength problem of knuckle part is eliminated.

DESCRIPTION OF THE PREFERRED EMBODIMENTS

Figure 1:
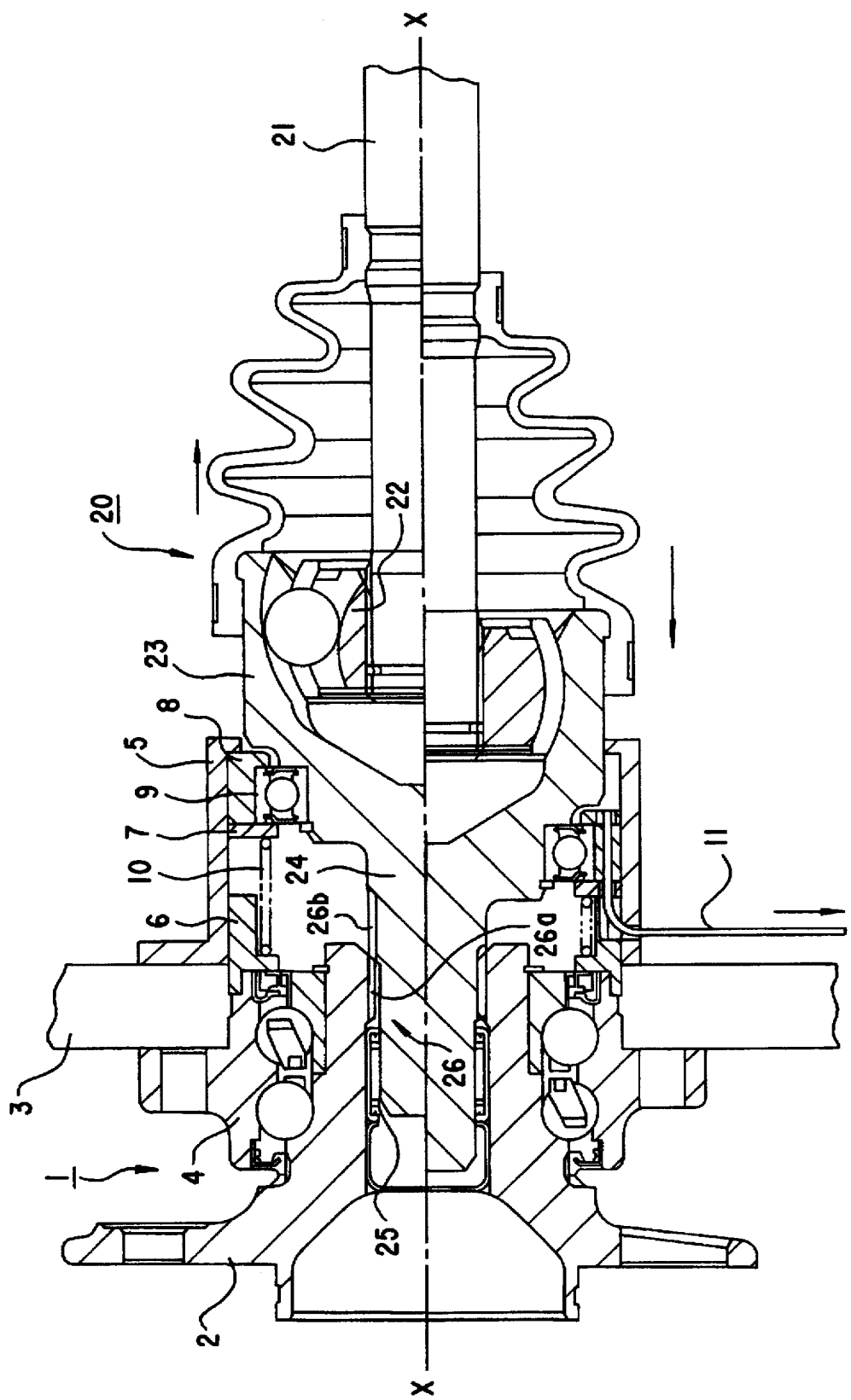
FIG. 1 is a sectional view showing an embodiment of the invention, in which the upper half above the axial line X shows the power transmission cut-off state (two-wheel drive), and the lower half beneath the axial line X denotes the power transmission state (four-wheel drive).

Referring now to the drawings embodiments of the invention are described in detail below.

FIG. 1 shows a freewheel clutch in an embodiment of the invention, in which the portion above the axial line X denotes the power transmission cut-off state (two-wheel drive state), and the portion beneath the axial line X represents the power transmission state (four-wheel drive state).

An axle bearing 1 comprises a hollow axle hub 2 coupled to an idler wheel, not shown, with a hub bolt, and a hub outer ring 4 coupled to a steering knuckle 3 with a hub bolt.

At the car body side (the right side in the drawing) of the axle bearing 1, a tubular housing 5 is disposed, and two annular spring retainers 6, 7, a slide sleeve 8, and a ball bearing 9 are disposed inside of the tubular housing 5. Between the spring retainer 6 and spring retainer 7, a coil spring 10 is interposed. The spring retainer 6 is fitted and fixed to both outer circumference of car body side end of the hub outer ring 4 and inner circumference of idler wheel side (left side in the drawing) end of the tubular housing 5. The spring retainer 7 and slide sleeve 8 are fitted to the inner circumference of the car body side end of the tubular housing 5 so as to be slidable in the axial direction. The ball bearing 9 is fitted and fixed to the inner circumference of the slide sleeve 8.

A wire 11 is coupled to the slide sleeve 8. The wire 11 is extended outward through a penetration hole provided in the tubular housing 5, and is coupled to a changeover lever of two-wheel drive and four-wheel drive, not shown, or the like.

A constant velocity joint 20 comprises an inner member 22 coupled to an axle shaft 21, an outer member 23 supported inside of the globular housing 5 so as to be rotatable and slidable in the axial direction through the slide sleeve 8 and ball bearing 9, and a shaft 24 joined or integrally fitted to the outer member 23. The shaft 24 is inserted into the axle hub 2, and is supported by a needle roller bearing 25 rotatably and slidably in the axial direction. Incidentally, the constant velocity joint 20 shown in FIG. 1 is of fixed type (the type allowing only angular displacement between the drive shaft and driven shaft), but at the shaft end, not shown, of the axle shaft 21, a plunging type constant velocity joint (the type allowing both angular displacement and axial displacement between the drive shaft and driven shaft) is provided. Accordingly, the constant velocity joint 20 of the embodiment can move in the axial direction together with the axle shaft 21.

Between the axle hub 2 of the axle bearing 1 and the outer member 23 of the constant velocity joint 20, a mutually engageable engaging portion 26 is provided. In this embodiment, the engaging portion 26 is composed of a spline 26a formed on the inner surface of the axle hub 2, and a spline 26b formed on the outer suface of the shaft part 24 of the constant velocity joint 20.

As shown in the upper half of FIG. 1, in two-wheel drive, by the elastic force of the spring 10 interposed between the spring retainers 6 and 7, the constant velocity joint 20 is pressed to the right side in the drawing (car body side), and the spline 26a and spline 26b of the engaging portion 26 depart from each other. As a result, coupling of the axle hub 2 and shaft part 24 of the constant velocity joint 20 is cut off, so that the power transmission is cut off between the axle shaft 21 and idler wheel. On the other hand, as shown in the lower half of FIG. 1, in four-wheel drive, by the tension of the wire 11 (generated by manipulation of changeover lever or the like), the constant velocity joint 20 resists the elastic force of the spring 10, and slides and displaces in the axial direction to the left side in the drawing (to the idler wheel side), so that the spline 26a and spline 26b of the engaging portion 26 are engaged with each other. As a result, the axle hub 2 and the shaft part 24 of the constant velocity joint 20 are coupled, and the power is transmitted between the axle shaft 21 and the idler wheel. By canceling the tension of the wire 11, by the elastic restoring force of the spring 10, the constant velocity joint 20 slides and displaces in the axial direction to the right side in the drawing, thereby automatically changing over to the two-wheel drive state shown in the upper half of FIG. 1.

Figure 2:
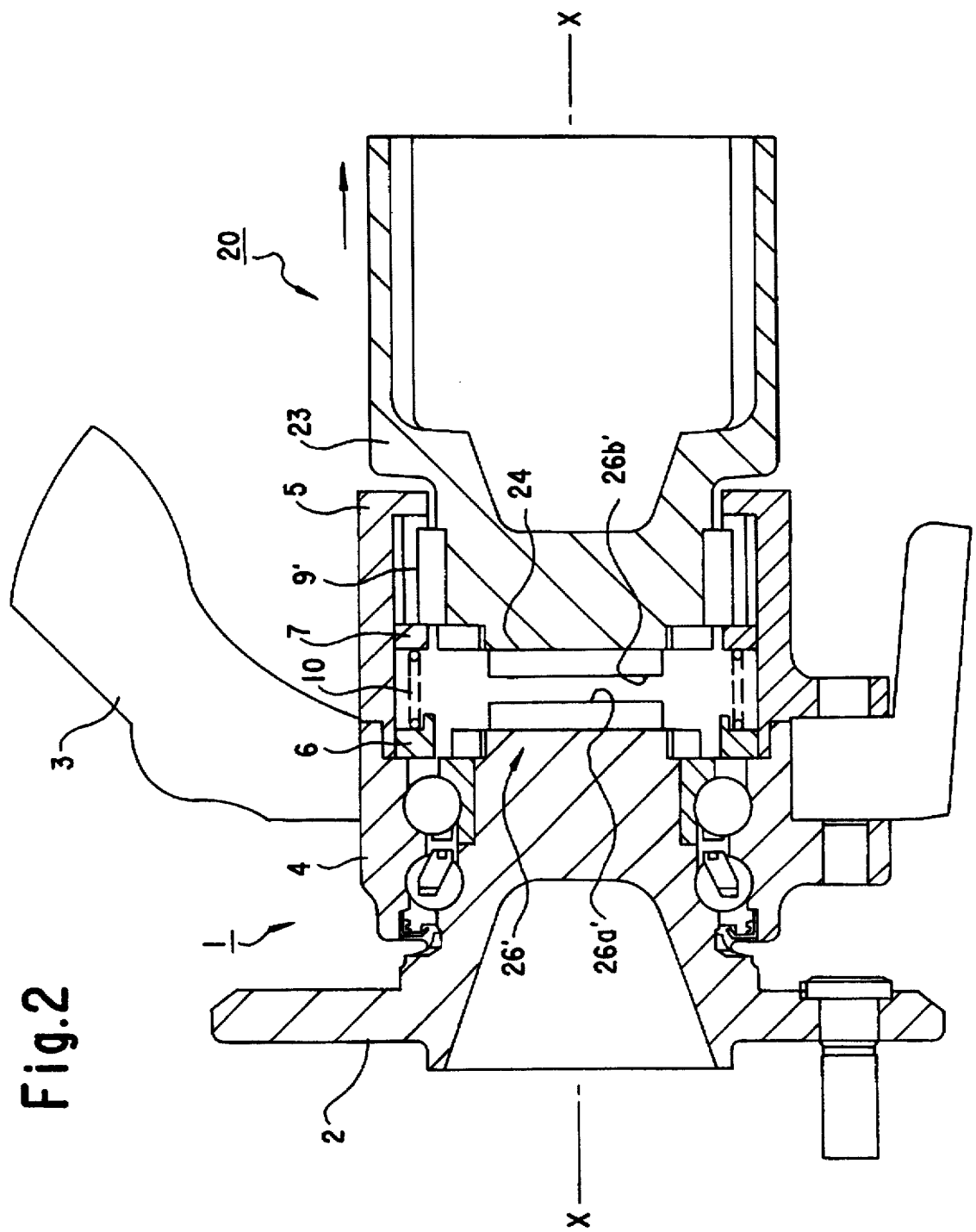
FIG. 2 is a sectional view showing another embodiment of the invention, relating to power transmission cut-off state (two-wheel drive).

In the embodiment shown in FIG. 2 (showing the power transmission cut-off state), an engaging portion 26' is composed of a face spline 26a' formed on the car body side end face of an axle hub 2, and a face spline 26b' formed on the idler wheel side end face of a shaft part 24 of an outer member 23 of a constant velocity joint 20. A tubular housing 5 is fitted and fixed to the inner circumference of the car body side end of a hub outer ring 4. The outer member 23 of the constant velocity joint 20 is supported so as to be rotatable and slidable in the axial direction through a needle roller bearing 9'. An outer ring of the needle roller bearing 9' having an outer spline to be fitted to an inner spline of the tubular housing 5. To the inner member, not shown, an axle shaft is coupled. The constant velocity joint 20 in this embodiment is of plunging type, which can plunge in the axial direction, relatively to the axle shaft. The sliding displacement in the axial direction of the constant velocity joint 20 is achieved by proper means such as wire, hydraulic and pneumatic device as mentioned above. As compared with the structure shown in FIG. 1, the dimension of the knuckle part in the axial direction is decreased, and the design is made further compact. The other basic structure and function and effect are same as in FIG. 1, and hence substantially same members and parts are identified with same reference numerals and duplicated explanations are omitted.

In the embodiments shown in FIG. 1 and FIG. 2, meanwhile, if the tension of the wire 11 is lost due to an unintentional reason during four-wheel drive, it is automatically changed over to two-wheel drive by the elastic restoring force of the spring 10, but generally the four-wheel drive vehicle is preferred to be designed so as to run in four-wheel drive mode in case of a trouble. The embodiment shown in FIG. 3 is based on such consideration.

Figure 3:
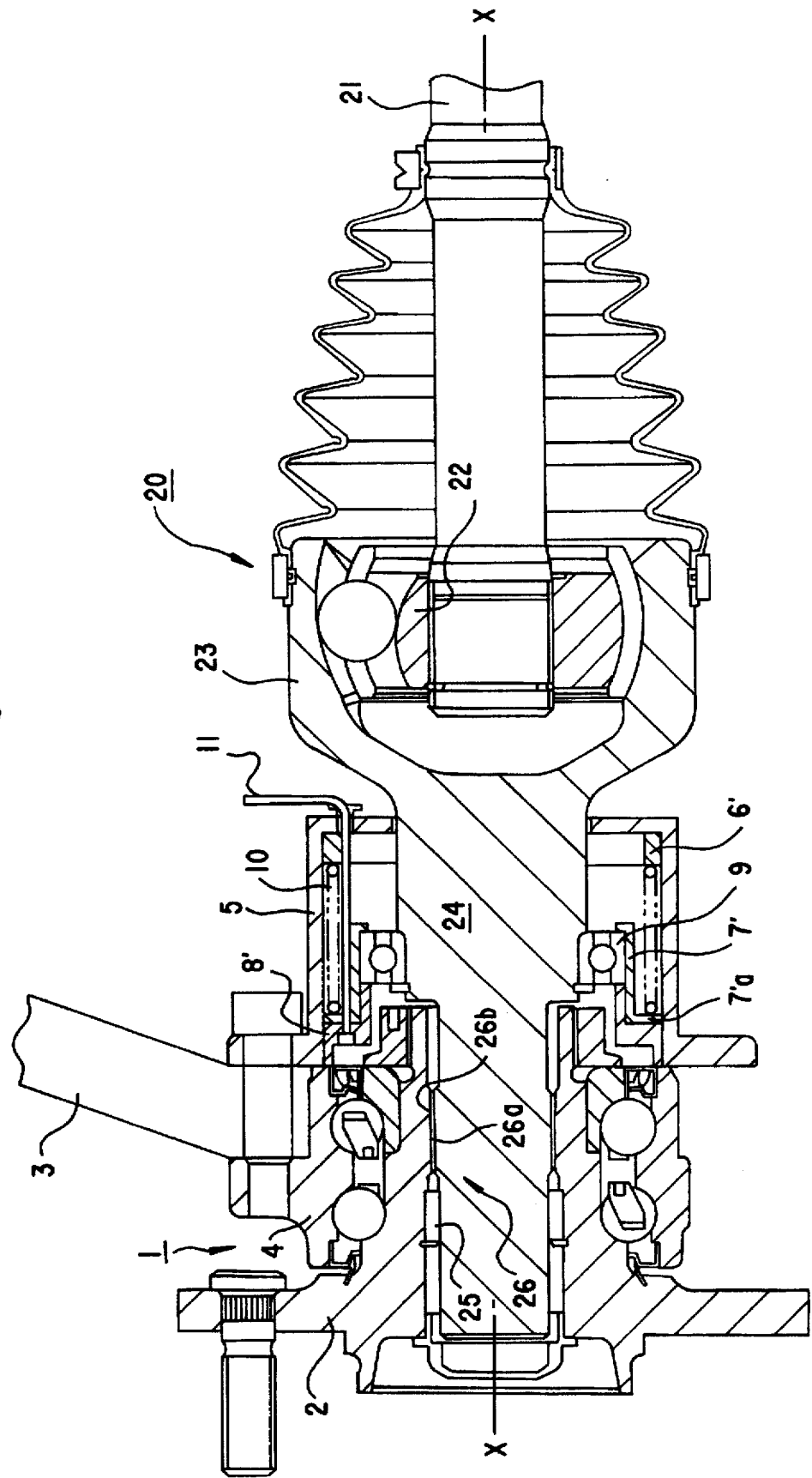
FIG. 3 is a sectional view showing a different embodiment of the invention, relating to power transmission statute (four-wheel drive).

As shown in FIG. 3, a spring retainer 6', a bearing housing 7', a wire stopper 8', and a ball bearing 9 are disposed inside of a tubular housing 5. The spring retainer 6' is fixed on the tubular housing 5, and the bearing housing 7' and wire stopper 8' are free to slide in the axial direction on the tubular housing 5. A coil spring 10 is interposed between the spring retainer 6' and a flange 7'a of the bearing housing 7', and the ball bearing 9 is fitted and fixed inside of the bearing housing 7'. A wire 11 is coupled to the wire stopper 8'.

While the tension of the wire 11 is net active, as shown in FIG. 3, the constant velocity joint 20 is pressed to the left side in the drawing (the idler wheel side), and the spline 26a and spline 26b of the engaging portion 26 are engaged with each other. Consequently, the axle hub 2 and the shaft part 24 of the constant velocity joint 20 coupled together, so that the power is transmitted between the axle shaft 21 and idler wheel (four-wheel drive). On the other hand, when the tension of the wire 11 acts, the constant velocity joint 20 resets the elastic force of the spring 10, and slides and displaces in the axial direction to the right side in the drawing (to the car body side), and the spline 26a and spline 26b of the engaging portion 26 are disengaged from each other. As a result, coupling of the axle hub 2 and shaft part 24 of the constant velocity joint 20 is canceled, so that the power transmission is cut off between the axle shaft 21 and idler wheel (two-wheel drive).

In the axle bearing 1 of the foregoing embodiments, the inner raceway surface with which the ball row of the idler wheel side contacts is formed directly on the outer circumference of the axle hub 2, but, alternatively, a pair of inner bearing ring may be fitted to the outer circumference of the axle hub. That is, the invention is applicable regardless of the type of the axle bearing or the type of the constant velocity joint.

What is claimed is:

1. A freewheel clutch for selectively interconnecting and disconnecting an axle shaft and an idler wheel, comprising:
   an axle bearing having an axle hub coupled to the idler wheel, and a hub outer ring coupled to a steering knuckle;
   a tubular housing disposed at an inboard end of said axle bearing;
   a constant velocity joint having an inner member coupled to the axle shaft and an outer member supported by said tubular housing rotatably and slidably in the axial direction;
   a spring means disposed in said tubular housing for pushing said outer member of said constant velocity joint in the axial direction with respect to said axle bearing to keep said outer member at a first position;
   engaging portions directly formed at said axle hub of said axle bearing and said outer member of said constant velocity joint, said engaging portions engaging and disengaging each other by axial sliding displacement of said outer member of the constant velocity joint between said first position and a second position; and
   selector means for making said outer member of said constant velocity joint axially slidably displace against said spring means from said first position to said second position to change over the engaging and disengaging of said engaging portions.

2. A freewheel clutch as set forth in claim 1, wherein said selector means is a wire exerting an axial sliding force to the outer member of the constant velocity joint.

3. A freewheel clutch for selectively interconnecting and disconnecting an axle shaft and an idler wheel, comprising:

an axle bearing having a hollow axle hub coupled to the idler wheel and a hub outer ring coupled to a steering knuckle;

a tubular housing disposed at an inboard end of the axle bearing;

a constant velocity joint having an inner member coupled to the axle shaft and an outer member supported by the tubular housing rotatably and slidably in the axial direction, the outer member having a shaft portion extending therefrom to an outboard side, the shaft portion supported by an inner peripheral portion of the axle hub rotatably and slidably in the axial direction;

a spring means disposed in the tubular housing, the spring means pushing the outer member of the constant velocity joint in the axial direction with respect to the axle bearing to keep the outer member at a first position;

engaging portions directly radially formed at the inner peripheral portion of the axle hub of the axle bearing and the shaft portion of the outer member of the constant velocity joint, the engaging portions engaging and disengaging each other by axial sliding displacement of the outer member between the first position and a second position; and selector means for making the outer member of the constant velocity joint axially slidably displace against the spring means from the first position to the second position to change over the engaging and disengaging of the engaging portions.

4. A freewheel clutch as set forth in claim 3, wherein said engaging portions are mutually engageable splines.

5. A freewheel clutch as set forth in claim 3, wherein said selector means is a wire exerting an axial sliding force to the outer member of the constant velocity joint.

* * * * *